United States Patent [19]

Teich

[11] Patent Number: 5,215,157

[45] Date of Patent: Jun. 1, 1993

[54] ENCLOSURE FOR VEHICLE ENGINE COMPARTMENT

[75] Inventor: Michael Teich, Mannheim, Fed. Rep. of Germany

[73] Assignee: Deere & Company, Moline, Ill.

[21] Appl. No.: 837,846

[22] Filed: Feb. 18, 1992

[30] Foreign Application Priority Data

Feb. 25, 1991 [DE] Fed. Rep. of Germany ....... 4105844

[51] Int. Cl.⁵ .............................................. B62D 25/10
[52] U.S. Cl. .................................. 180/69.24; 180/68.4; 180/312; 296/24.1
[58] Field of Search ................. 180/69.24, 69.2, 69.21, 180/68.4, 312, 299; 296/24.1

[56] References Cited

U.S. PATENT DOCUMENTS

| | | | |
|---|---|---|---|
| 3,064,748 | 11/1962 | Hill | 180/69.21 |
| 4,449,606 | 5/1984 | Buschbom et al. | 180/299 |
| 4,506,749 | 3/1985 | Sieren | 180/69.2 |
| 4,572,312 | 2/1986 | France et al. | 180/69.21 |
| 4,593,786 | 6/1986 | Tate | 180/312 |
| 4,889,203 | 12/1989 | Hagarty | 180/69.24 |

FOREIGN PATENT DOCUMENTS 714362 8/1954 United Kingdom ............... 180/69.2

Primary Examiner—Eric D. Culbreth

[57] ABSTRACT

An enclosure for a vehicle engine, particularly for a agricultural or industrial vehicle, includes a cover such as a hood, a front grill and side shields, to cover the engine and possibly additional vehicle components. The enclosure includes a rigid frame which can be pre-assembled along with vehicle accessories and then attached to a part of the vehicle during final vehicle assembly, at which time the enclosing parts can also be attached. The frame can be attached to the vehicle by means of shock absorbing mounts to reduce the transmission of vibrations and torsion to the enclosure assembly. The frame is supported at essentially three spots to reduce the transmission of torsion to the enclosure assembly.

8 Claims, 4 Drawing Sheets

ENCLOSURE FOR VEHICLE ENGINE COMPARTMENT

BACKGROUND OF THE INVENTION

This invention relates to an enclosure for the engine compartment of a motor vehicle, in particular for an agricultural or industrial vehicle. More particularly, this invention relates to enclosure which may include covers such as an engine hood, a front grill and side covers, which at least partially enclose the engine compartment as well as other vehicle accessories, if required.

It is known practice to enclose the engine compartment at the front with a front plate or a radiator grill, which can be attached at the front of the engine to a support a trestle connected to the engine (block assembly of engine, transmission and support trestle). The top of the engine is enclosed by a hood hinged about the region of the cab. Side covers are attached to the side of the engine by retaining struts, attaching parts or the like. Accessories such as a radiator, air filter, oil cooler, condenser (air conditioning system), battery, and electric horn are attached to the engine block at various locations or to attaching parts connected to the engine.

A disadvantage of such an assembly is that a relatively costly assembly is required, which occurs during the final assembly of the vehicle on the conveyor line and which makes it difficult or even impossible to reduce the assembly time cycle. Furthermore, attaching components must be provided on the engine block and at other locations for the various accessories. Vibrations from the engine and the chassis are transmitted directly to the accessories and may impair their operation and endurance life. Noise is transmitted through the structure without any damping to the cover components.

SUMMARY OF THE INVENTION

An object of the present invention is to provide an engine enclosure of the aforementioned type, but which avoids the disadvantages cited above.

Another object is to reduce the transmission of vibrations and torsion from the engine block or a vehicle base frame to the covers and to vehicle accessories.

Another object is to is to provide an engine enclosure which is easier to assemble.

These and other objects are achieved by this invention by wherein a sufficiently rigid frame is attached to the engine, or to the vehicle frame and the components of the enclosure are attached to this frame. Preferably the frame is so designed that various vehicle accessories may also be attached thereto.

Covers such as an engine hood, a front grill, or a front plate, and side covers may be installed at appropriate locations on the frame. Vehicle accessories such a radiator, an oil cooler, a condenser for an air conditioning system, an air filter, a battery, a horn and headlights may also be installed at appropriate locations on the frame.

The frame is preferably configured as a box-shaped structure and is formed by several frame components bolted together. It may include two generally rectangular side frames that are welded assemblies of individual parts which can be bolted together by several transverse struts. Prior to its assembly the individual components of the frame require relatively little storage space.

In the forward region the two side frames are preferably connected by bolts to a base plate. The base plate, consisting of a sheet-metal part with formed edges, provides stiffening for the frame, on the one hand, and sealing on the other hand, so that the air ingested by the engine fan is conducted exclusively through the radiator grill or the filters provided for this purpose. The aforementioned forward attaching points that support the frame are provided in the base plate. The vehicle battery can be attached to the base plate.

In the region of the frame forward of the engine, the side frames are provided with vertical guides into which a radiator can be inserted from above so that it is perpendicular to the direction of travel of the vehicle. The guides are configured as U-shaped channels open to the interior of the frame. In the lower region of the guides rubber components are located that permit the radiator to be cushioned.

The vertical guides of the side frame are bolted in their upper region to a transverse member, for example, a vertical sheet metal stiffener. This may be a relatively wide sheet-metal part, which is provided with penetrations for the air flow to the radiator located further to the rear, and which exhibits a stiffness sufficient to absorb the torsional forces acting to twist the frame. The stiffness can be enhanced by beads in the sheet-metal. An oil cooler, air filter and condenser may be attached to the transverse stiffener.

The frame can be pre-assembled with the necessary accessories, although initially without the hood and side covers. It can then be available at final vehicle assembly as a complete frame sub-assembly. In the final assembly it is only necessary to attach the frame sub-assembly to the vehicle body or to a vehicle sub-frame, to connect the lines to the accessories, and to install the enclosure covers and the hood. This permits a reduction in cycle time for the vehicle final assembly.

Preferably the frame is supported generally at three points on the vehicle frame by elastic connections. Alternatively, the frame may be supported on a support trestle (not shown) which in turn is connected to the engine. The elastic connections may be configured as isolators, damping devices or rubber bushings. The transmission of torsion, structure-borne noise and shock from the tractor body or the vehicle sub-frame to the frame is reduced because of the stiffness of the frame and the elastic three-point attachment to the tractor body.

If the accessory frame of this invention is used in a tractor with a sub-frame, and the sub-frame is twisted during operation over very uneven ground, then this torsion is not transmitted at all or is transmitted only to a limited degree to the accessory frame. Thus, the load on accessories attached to the frame is less than the load on accessories attached directly to the tractor body. As a result, the endurance life of the accessories can be extended. For example, soldered joints in radiators would not be as highly loaded. Furthermore, more compact accessories may be used compared to those required for the conventional design. Batteries mounted in the frame may exhibit a higher installation density, since they are exposed to lower levels of shock and vibration.

In the three-point suspension of the frame, two rear attachment points may be spaced far apart, while the two forward attachment points provided may be located very close together. This approaches a three-point suspension, which has the advantage that torsion in the sub-frame does not result in torsion of the accessory frame. The frame can be assembled, at least partially, from U-shaped channels so that electric cables, lines and the like can be routed therethrough. The channels formed by the U-shaped sections offer protection and stable positioning for the cables and lines.

Furthermore, the frame can be arranged so that it enhances the external design of the tractor. Preferably the longitudinal struts of the side frame can provide visible surfaces to which decals may be attached.

The side covers may be subdivided into several areas along the direction of travel that can be removed individually (shorter panels) so that during service work on certain engine parts or accessories only the appropriate portion of the enclosure need be removed or opened. For service, the individual side covers of the frame may be unbolted, opened on hinges or otherwise removed or opened to provide good accessibility to the engine.

The hood is supported on a transverse hinge in the region of the vehicle cab. Its forward region can be locked to the frame and can be swung upward. The forward end of the hood carries at least a part of the radiator grill, so that the opened hood permits easy access to the accessories located forward of the radiator.

DETAILED DESCRIPTION

Figure 1:
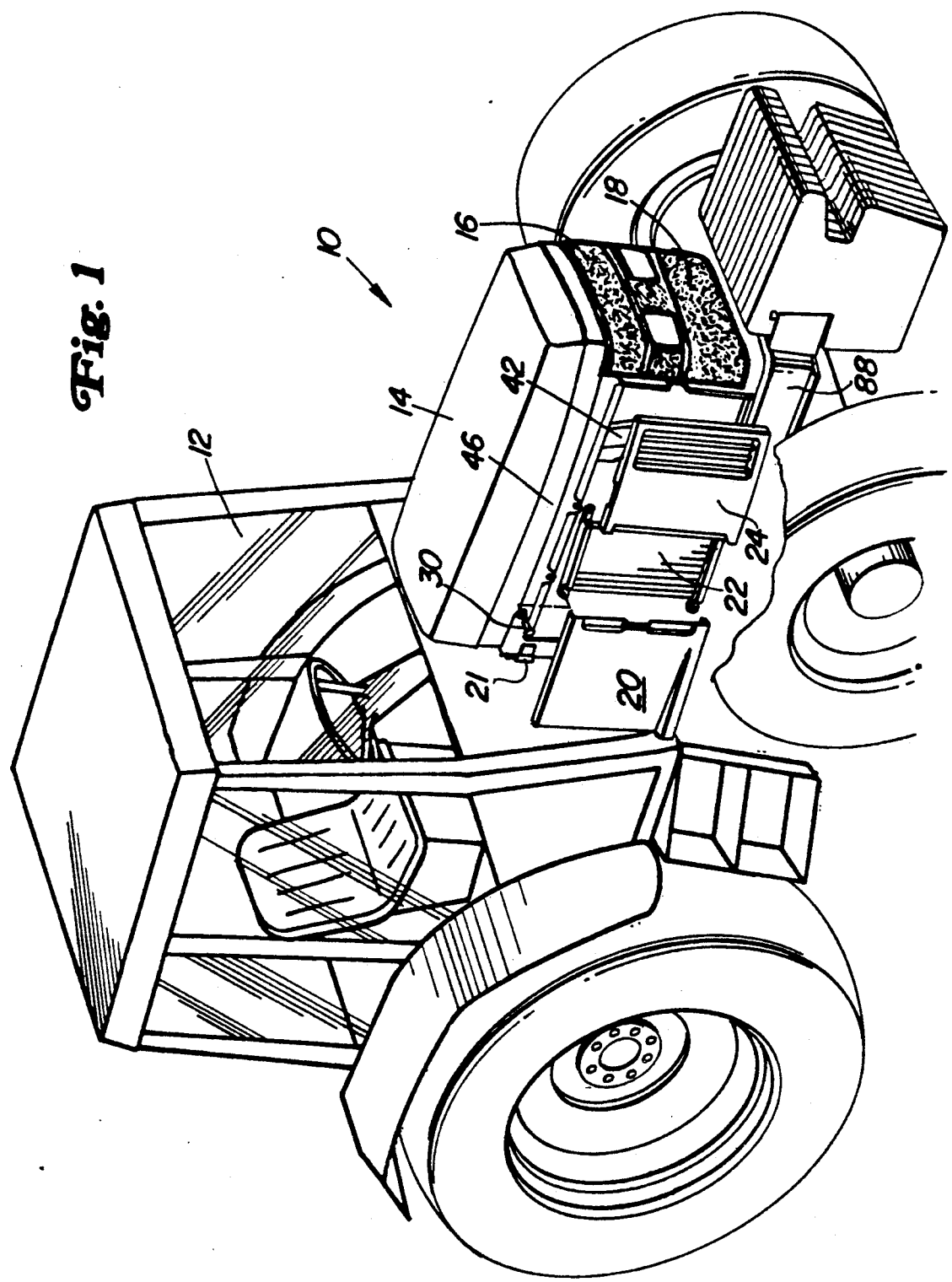
FIG. 1 is a perspective view of an agricultural tractor with an engine enclosure according to the invention.

As seen in FIG. 1, an agricultural tractor has an engine (not shown) which is located in the region 10 forward of the operator's cab 12. The engine is surrounded by enclosure covers which are shown, in exploded manner, offset away from their actual installed position. The enclosure covers include an engine hood 14, a two-piece front grill 16, 18 and side covers 20, 22, 24. The side covers 20, 22, 24 that are visible on the right side of the tractor include a service door 20, a ventilating screen 22 and a forward side cover 24.

Figure 2:
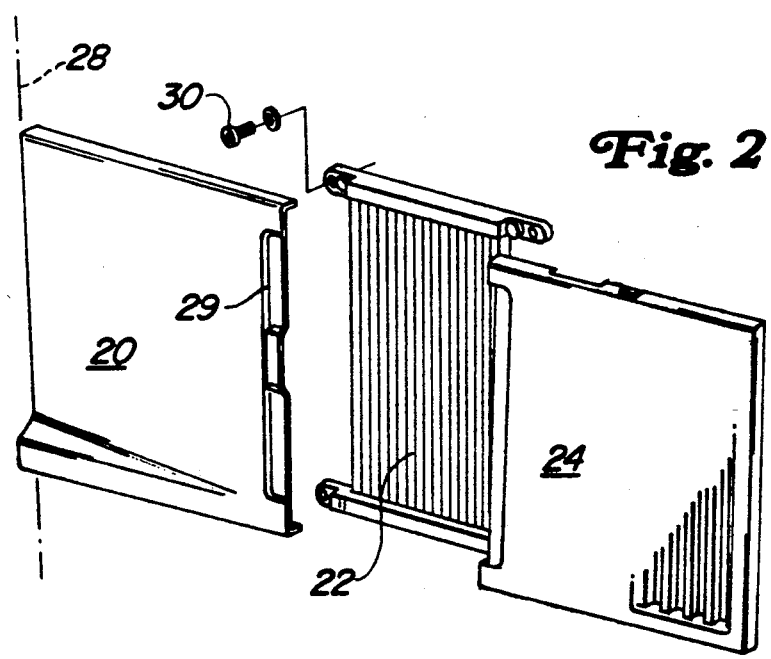
FIG. 2 is a perspective view of three side covers which may be attached to the frame of the present invention.
Figure 3:
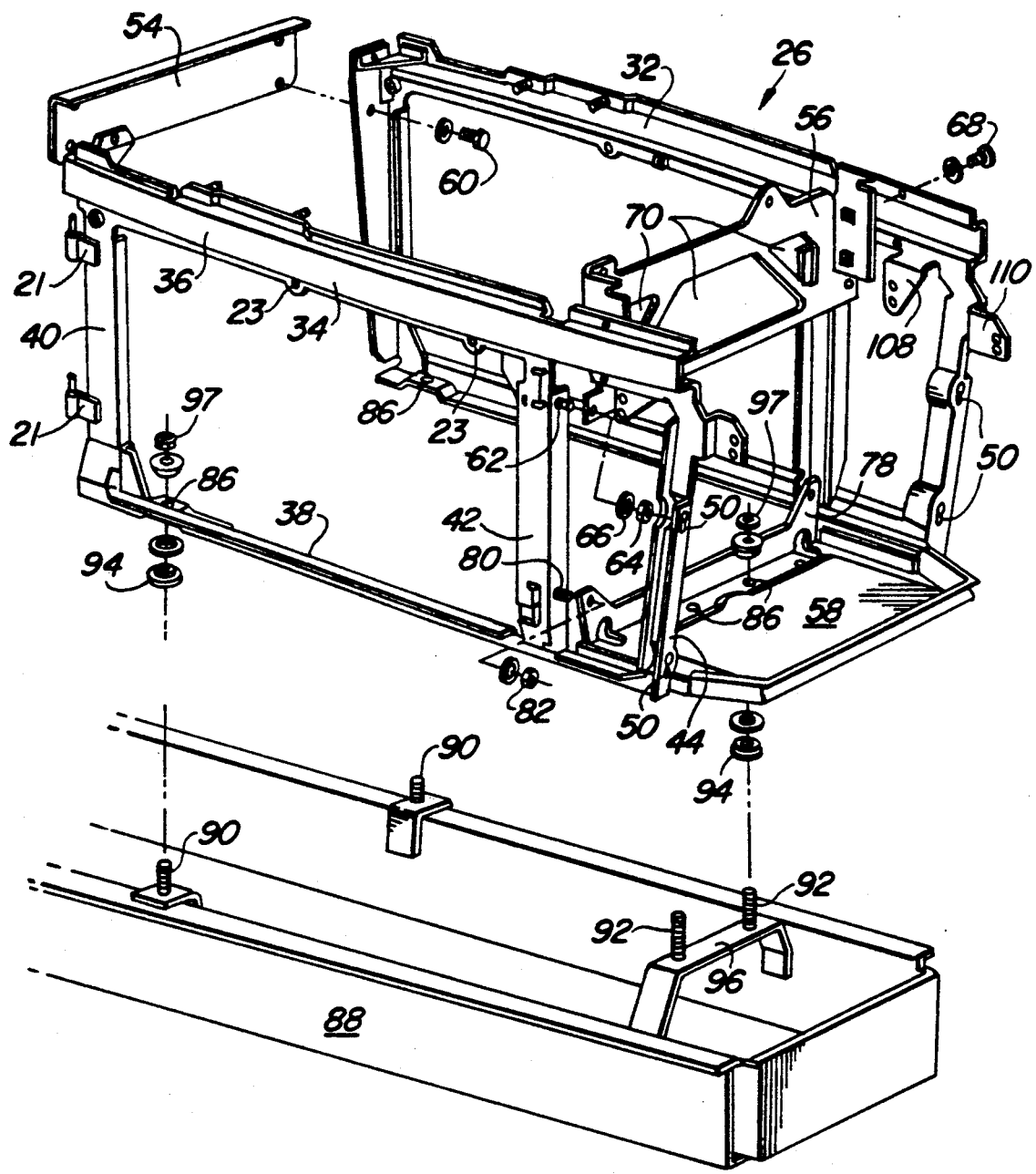
FIG. 3 is a perspective exploded view of a frame according to the invention.

The service door 20 is attached at its rear by vertical hinges 21, indicated in FIG. 2 by an axis 28, to a frame 26 shown in FIG. 3. It can be opened by pulling on the handgrip 29. When the service door 20 is open, service can be performed on accessories located behind it, such as oil dipstick, oil filler cap, fuel filter, water separator, locking lever for the release mechanism of the engine hood 14 and the like. The service door 20 can be configured so as to be locked with a key, to prevent unauthorized access.

The ventilating screen 22 can be attached to the frame 26 using holes 23 that carry bolts 30, only one of which is shown in FIGS. 1 and 2. The ventilating screen 22 is arranged in the direction of travel behind the radiator 48 of the engine and contains vertical vanes to permit cooling air to exit. Simultaneously the ventilating screen 22 is a safety device since it covers the fan and V-belts of the engine and prevents contact therewith.

The forward side cover 24 is so arranged that it can be attached by inserting its lower region into the frame 26. In its upper region the side cover 24 is provided with locking devices, not shown, by means of which it can be attached rapidly to the frame 26. The arrangement is such that the forward side cover cannot be removed when the engine hood 14 is closed. The forward side cover 24 can be removed easily if cleaning or maintenance work is required on accessories behind it, such as radiator, oil cooler, condenser, vehicle battery and the like. In its forward region the side cover 24 is provided with a multitude of penetrations to admit cooling air into the interior space enclosed by the forward region of the frame. The penetrations are sized so that larger foreign objects and plant parts are prevented from entering.

The frame 26 is box-shaped and consists of several parts bolted together as shown in FIG. 3. This consists in general of two side frames 32, 34 rectangular in shape and arranged on each side of the engine that are connected by transverse struts that can be bolted together. Each side frame 32, 34 consists of an upper horizontal U-shaped channel 36, a lower horizontal angle section 38 and three connecting struts 40, 42, 44. These parts are welded together, so that the side frames 32, 34 are available at final assembly as complete individual parts that occupy only a limited storage space. The channels 36 and 38 and the struts 40 and 42 surround a laterally facing generally rectangular opening therebetween.

The upper U-shaped channel 36 includes a surface 46, facing outward that is visible after assembly of the engine enclosure (FIG. 1), which is not covered by any of the enclosure parts, that is, neither by the engine hood 14 nor by the side covers 20, 22, 24. During final assembly a model number for the tractor or the like can be applied to this surface 46.

Figure 5:
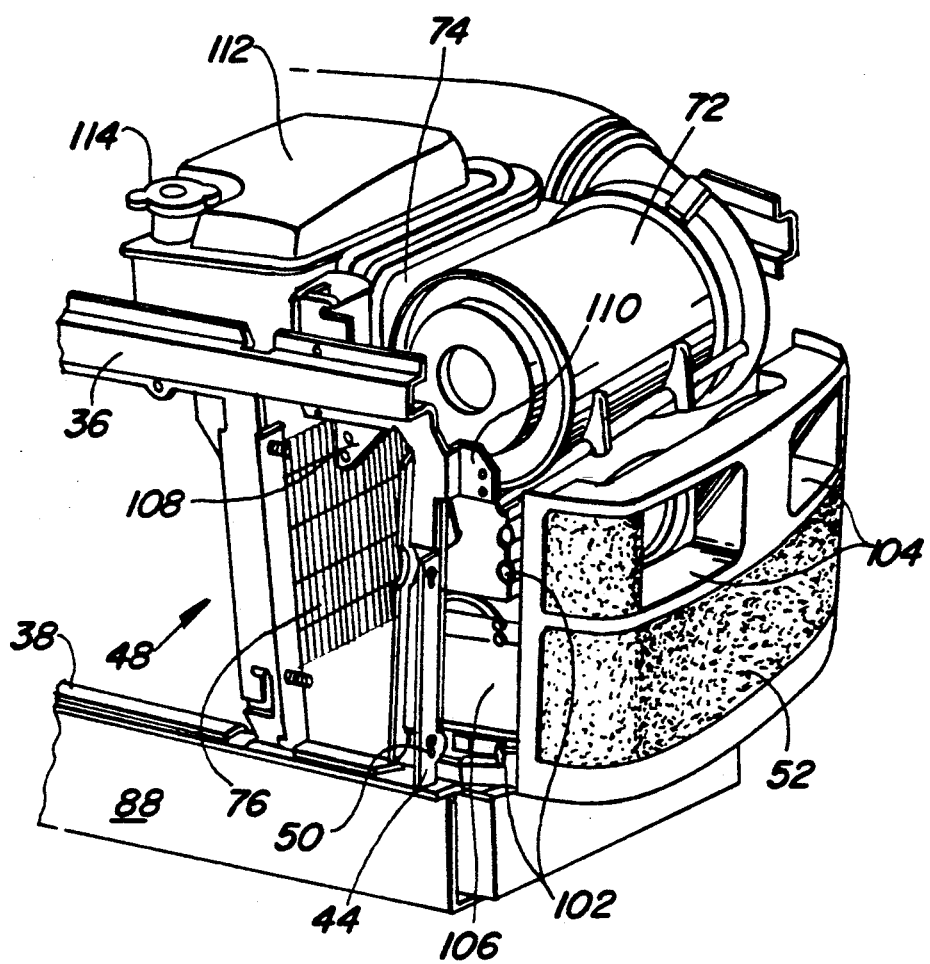
FIG. 5 is a perspective view of the forward region of the frame with vehicle accessories and without enclosure covers.

The rear connecting strut 40 consists generally of a U-shaped channel facing the interior of the frame. It carries the hinges 21 for the service door 20. The center connecting strut 42 also consists of a U-shaped channel open to the interior of the frame. The opposite central connecting struts 42 are designed and arranged in such away that in the pre-assembled frame they form vertical guides into which a radiator 48 can be inserted from above (FIG. 5). The guides 42 are provided with rubber parts (not shown) that provide a cushioned contact surface for the radiator 48. The forward connecting strut 44 contains connecting means 50 for the attachment of a lower front grill 52.

The side frames 32, 34 are connected by connecting members that include a transverse strut 54, a transverse stiffener 56 and a base plate 58. The transverse strut 54 is configured as an angle section for the sake of stiffness, and is attached to the rear, upper region of the side frames 32, 34 by bolts 60, only one of which is shown in FIG. 3. Accordingly, in the assembled condition, the transverse strut 54 is located above the engine and immediately in front of the operator's cab 12.

The transverse stiffener 56 is a vertical sheet-metal stiffener which is attached to the front of the center connecting strut 42 by bolts 62, washers 66 and nuts 64. The transverse stiffener 56 is attached to the upper region of the side frames 32, 34 by bolts 68. The transverse stiffener 56 is provided with openings 70 that correspond to air flow passages in a radiator 48 that can be mounted behind the transverse stiffener 56. In addition, it contains attaching means for other accessories, for example, the oil cooler 74 and the condenser 76 of an air conditioning system.

The base plate 58 is configured as a tub, with its side edges bent upward. The rear edge 78 of the base plate 58 may be connected in the same way as the transverse stiffener 56 by bolts 80 of the center connecting strut 42 and secured by nuts 82. The attachment to the lower angle section 38 uses screw (not shown). The base plate 58 hermetically seals the forward region of the frame 26 from below, so that from here no cooling air can reach the interior of the frame 26.

The pre-assembled frame 26 has considerable stiffness, stability and resistance to torsion. In the lower angle sections 38 of the side frames 32, 34 and in the base plate 58 a total of four bores 86 are provided, whose position corresponds to pins 90, 92 provided on the vehicle frame 88, which are used for the attachment of the frame 26 to the vehicle frame 88. Rubber bushings 94 are applied to the pins 90, 92 before the assembly of the vehicle frame 88 to suppress torsional forces and vibrations that emanate from the vehicle frame 88. The two rear pins 90 are attached to spars of the vehicle frame 88 and are spaced relatively far from each other. The two forward pins 92 are attached to a connecting bridge 96 that is arranged between the spars. Their distance from each other is relatively small. Due to the relative spacing of the pins 90, 92 the frame 26 is essentially attached to a three-point support, so that torsional deflections of the vehicle frame 88 are not transmitted to the frame 26. After the frame 26 engages the pins 90 through the rubber bushings 94, it can be secured by nuts 97.

Figure 4:
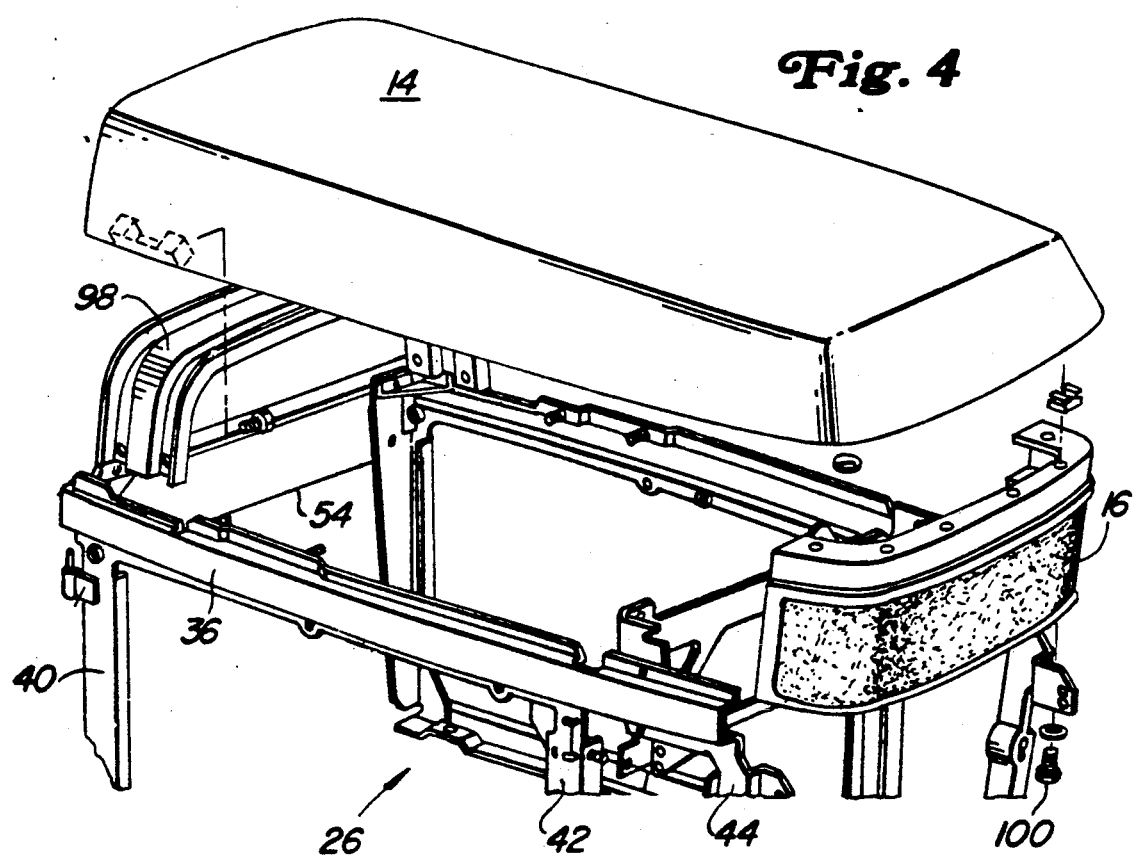
FIG. 4 is a perspective exploded view of the upper region of the engine enclosure according to FIG. 1.

FIG. 4 shows the upper region of the frame 26 with the engine hood 14 above it and the upper part of the front grill 16. In the rear region of the frame 26 the two upper in-shaped channels 38 are connected to each other by a strap 98 with an upward bow. The rear region of the engine hood 14 is supported by the strap 98. This is also the location of the hood hinge axis (not shown) about which the forward region of the hood pivots upward when the engine hood 14 is opened. The hood opening mechanism may be of any known design.

At the front end of the engine hood 14 the upper part of a two piece front grill 16 can be attached by bolts 100. Hence, upon opening the engine hood 14 the upper part of the front grill 16 is also raised, in order to provide good accessibility to the accessories located in the forward region of the frame, as shown in greater detail in FIG. 5.

The lower front grill 52 is hooked onto the forward connecting struts 44 of the frame 26. For this purpose the front grill 52 carries projecting screws 102, of which only two are shown in FIG. 5. During assembly the screw heads are inserted into recesses 50 that taper downward in the connecting struts 44. Pressing downward on the front grill 52 clamps the screw heads in the recesses 50.

FIG. 5 shows the arrangement of some of the accessories in the forward region of the frame 26. Headlights 104 are integrated into the lower front grill 52. The vehicle battery 106 is attached to the base plate 58. Above that an air filter 72 is attached to the brackets 108 and 110. As already noted, the radiator 48 is inserted into the guide formed by the two connecting struts 42, 44 which is covered in FIG. 5 by the condenser 76 and hence is not visible, but whose position is indicated by the arrow 48 in FIG. 5.

A shroud may be attached to the frame behind the radiator so that when the frame is assembled the engine fan runs within the shroud. Sufficient clearance should be provided to allow relative motion (which may be caused by twisting of the vehicle frame 88 or by vibrations) between the fan which is attached to the engine, and the shroud which is attached to the frame.

Above the radiator 48 an expansion chamber 112 is attached with a filler 114 for the coolant. Ahead of the radiator 48 an oil cooler 74 is mounted on the transverse stiffener 56 and below that a condenser 76 of an air conditioning system.

In addition to the accessories described here, other vehicle components, for example, a horn or hydraulic oil reservoir, may be arranged in the forward region of the frame 26. Very good accessibility to these accessories is assured. For this purpose it is necessary only to raise the engine hood 14 and to remove the forward side covers 24 and, if necessary, the lower front grill 52.

The electric, hydraulic and other lines for the accessories are routed through the channels formed by the U-shaped section of the frame components and are thereby protected from damage.

Although the invention has been described in terms of only one embodiment, anyone skilled in the art will perceive many varied alternatives, modifications and variations in the light of the preceding description, all of which fall under the present invention.

I claim:

1. A motor vehicle engine compartment enclosure characterized by:
   a rigid enclosure frame which is attached to a frame of the vehicle, the enclosure frame having enclosing parts and vehicle accessories attached thereto, the enclosure frame being attached to the vehicle frame at a plurality of support points by means of elastic connectors, there being two forward and two rearward support points, the two forward support points coupling a forward portion of the enclosure frame to a forward portion of the vehicle frame, the two rearward support points coupling a rear portion of the enclosure frame to the vehicle frame, and the two rearward support points being spaced farther apart than the two forward support points.

2. The enclosure of claim 1, wherein:
   the enclosure frame is box-shaped in design and is composed of two generally rectangular one-piece side frames which are bolted to each other by transverse struts.

3. The enclosure of claim 2, wherein:
   a base plate is arranged in a forward region between the side frames.

4. The enclosure of claim 2, wherein:
   the side frames include generally vertical guides into which a radiator can be inserted.

5. The enclosure of claim 2, wherein:
   a transverse stiffener is provided in the upper region of the enclosure frame between the two side frames to provide torsional stiffness for the enclosure frame and to accommodate the mounting of vehicle accessories.

6. The enclosure of claim 1, wherein:
   the enclosure frame is at least partially composed of U-shaped channels.

7. The enclosure of claim 1, wherein:
   at least one side of the enclosure frame is provided with a plurality of side covers that can be mounted individually, at least one of which is configured as a door.

8. The enclosure of claim 1, wherein:
one of the enclosing parts comprises a two-piece front grill comprising an upper front grill which is attached to the front end of the engine hood, and a lower front grill which is attached to the enclosure frame.

* * * * *